(12) United States Patent
Seipel et al.

(10) Patent No.: US 8,857,591 B2
(45) Date of Patent: Oct. 14, 2014

(54) TORQUE-LIMITED COUPLING ELEMENT AND METHOD FOR TORQUE-LIMITED COUPLING

(75) Inventors: Björn Seipel, Florstadt (DE); Michael Matthias, Darmstadt (DE); Marco Jackel, Biebergemünd/Kassel (DE)

(73) Assignee: Fraunhofer-Gesellschaft zur Förderung der Angewandten Forschung e.V., Munich (DE)

( * ) Notice: Subject to any disclaimer, the term of this patent is extended or adjusted under 35 U.S.C. 154(b) by 279 days.

(21) Appl. No.: 13/386,094

(22) PCT Filed: Jul. 15, 2010

(86) PCT No.: PCT/EP2010/004349
§ 371 (c)(1),
(2), (4) Date: Jan. 20, 2012

(87) PCT Pub. No.: WO2011/009571
PCT Pub. Date: Jan. 27, 2011

(65) Prior Publication Data
US 2012/0138407 A1    Jun. 7, 2012

(30) Foreign Application Priority Data

Jul. 21, 2009 (DE) .......................... 10 2009 034 055

(51) Int. Cl.
*F16D 43/206* (2006.01)
*F16D 7/08* (2006.01)
*F16D 37/02* (2006.01)

(52) U.S. Cl.
CPC .............. *F16D 43/206* (2013.01); *F16D 37/02* (2013.01)

USPC ........................ 192/56.33; 192/56.62; 464/36

(58) Field of Classification Search
USPC ............ 192/56.3–56.33, 56.54, 56.57, 56.62; 464/36

See application file for complete search history.

(56) References Cited

U.S. PATENT DOCUMENTS

| 1,919,437 A | * | 7/1933 | Le Fevre ..................... 192/56.32 |
| 3,137,187 A | * | 6/1964 | Van Hoose ...................... 81/474 |
| 5,277,281 A | | 1/1994 | Carlson et al. |
| 5,967,273 A | | 10/1999 | Hampton |

(Continued)

FOREIGN PATENT DOCUMENTS

| DE | 28 28 321 A1 | 1/1980 |
| DE | 31 40 288 A1 | 4/1983 |
| DE | 197 41 275 A1 | 4/1999 |
| DE | 198 47 405 C1 | 7/2000 |

(Continued)

*Primary Examiner* — Richard M. Lorence
(74) *Attorney, Agent, or Firm* — Antonelli, Terry, Stout & Kraus, LLP.

(57) ABSTRACT

The invention is a torque-limited coupling element including an input and output rotatably mounted about a common rotational axis, at least one Connection which is transferred from a first position into a second position upon exceeding a settable limit torque acting between the input and the output wherein in the first position the at least one connection connects the input and the output in a rotationally fixed manner, and in the second position, the input and the output are rotatably mounted relative to one another. A displacement body is movably mounted within a chamber filled with a magnetorheological fluid with the position of the displacement body resulting from a holding force provided by the magnetorheological fluid being under influence of a magnetic field.

40 Claims, 1 Drawing Sheet

(56) References Cited

U.S. PATENT DOCUMENTS

| | | |
|---|---|---|
| 6,241,067 B1 | 6/2001 | Höck |
| 6,421,618 B1 | 7/2002 | Kliman et al. |
| 6,948,707 B2 | 9/2005 | Gradu |
| 7,225,905 B2 | 6/2007 | Namuduri et al. |
| 7,870,939 B2 | 1/2011 | Steinwender |
| 2005/0087408 A1 | 4/2005 | Namuduri et al. |
| 2007/0289837 A1 | 12/2007 | Wheals |
| 2009/0205917 A1 | 8/2009 | Steinwender |

FOREIGN PATENT DOCUMENTS

| | | |
|---|---|---|
| DE | 698 05 483 T2 | 11/2002 |
| DE | 11 2004 001 931 T5 | 8/2006 |
| DE | 601 17 068 T2 | 8/2006 |
| DE | 11 2005 001 458 T5 | 5/2007 |
| DE | 10 2007 015 053 A1 | 10/2008 |
| DE | 10 2007 019 584 A1 | 11/2008 |
| WO | WO 2006/086807 A1 | 8/2006 |
| WO | WO 2008/024957 A1 | 2/2008 |

* cited by examiner

US 8,857,591 B2

TORQUE-LIMITED COUPLING ELEMENT AND METHOD FOR TORQUE-LIMITED COUPLING

BACKGROUND OF THE INVENTION

1. Field of the Invention

The invention relates to a torque-limited coupling element with an input part and an output part each rotatably mounted about a common rotational axis, and at least one connecting means which from a first position, in which the connecting means interconnects the input part and output part in a rotationally fixed manner subject to the formation of a positive engagement, can be transferred into a second position upon exceeding of a predeterminable limit torque acting between the input part and output part, in which the input part and output part are rotatably mounted relative to each one another.

2. Description of the Prior Art

Torque-limited coupling elements are employed for example in torque wrenches, preferentially in so-called self-triggering torque wrenches, which allow tightening screw connections manually or actuatorily with a defined predeterminable torque. Such a torque wrench is disclosed in DE 31 40 288 A1, which provides a sleeve-like tool housing which in the interior thereof a coil spring is rotated to provide a variably adjustable spring characteristic on the output side the spring bears against a central ball centrally mounted within the housing, which in axial and radial directions presses against three coupling balls arranged in an equal angular distribution. The balls are radially guided in a cage structure and become operationally connected against a tool bushing radially surrounding the cage structure provided on the output side subject to the formation of a positive engagement. When a predeterminable torque between drive-end tool sleeve and output-end tool sleeve provided through the variably adjustable spring characteristic is exceeded, the coupling balls are radially pushed inwardly via a guide slotted link. As a result, the positive engagement between coupling balls and the output-end tool bushing is released, so that no further force transmission via the torque wrench is possible.

In a secondary development stage, devices for the torque transmission provide for the use of magnetorheological fluids, which constitute suspensions of magnetically polarizing particles in a carrier fluid. The viscosity and also other rheological properties of the fluids can be variably adjusted quickly and reversibly in the presence of a magnetic field. Such a magnetorheological torque transmission device is disclosed in DE 10 2007 019 584 A, which in a particular manner is suitable for forming a coupling, break, locking or blocking device or as man-machine interface element. The device comprises at least two device parts relatively mounted rotatably about a common rotational axis, which are separated by at least one torque transmission gap that is filled with a magnetorheological fluid and penetrated by a variably adjustable magnetic field. With controlled increasing magnetic field strength the viscosity of the magnetorheological fluid increases and at the same time also the friction between both device parts rotatably mounted about the rotational axis, between which a maximum torque ultimately dependent on the magnetic field can be transmitted. By contrast, the purely mechanical solution described above making use of the coupling balls described there, is now replaced by the magnetorheological fluid as force-transmitting element. On the one hand, this has the advantage of a simpler design embodiment avoiding moveably mounted, force-transmitting elements while on the other hand the magnetorheological fluid is subjected to high mechanical shear loads, as a result of which the magnetorheological fluid is subjected to degradations capable of sustainably influencing the functional properties of the fluid.

A multiplicity of further coupling embodiments, which for the force transmission utilize the variable viscosity adjustment of magnetorheological fluids dependent on the magnetic field, are based on the same coupling principle. In this connection, reference is made to: WO 2006/086807 A1, DE 10 2007 015 053 A1 and DE 698 05 483 T2.

DE 11 2005 001 458 T2 describes a rotary fluid coupling which attempts to minimize the disadvantageous degradating effects of the shear loads that occur with the above coupling types on the magnetorheological fluid between the input parts and output parts of the coupling rotating relative to one another. A coupling device releasable in series with the drive element of the coupling is provided which prevents a torque transmission between input part and output part if required.

SUMMARY OF THE INVENTION

Starting out from the known realization forms of coupling devices for the torque transmission between an input part and output part, the invention ensures that a torque transmission between the input part and output part can be adjusted in a manner that is as quantitatively exact as possible and particularly in those cases in which the predetermination of a maximum limit torque is required. On the other hand, the invention avoids the disadvantages connected with the previously known coupling systems, wherein the force transmission is based on magnetorheological fluids, particularly with respect to degradation of the magnetorheological fluids.

The torque-limited coupling element according to the invention is based on utilizing the proven, purely mechanical coupling concept for the general transmission of the torque between an input part and output part and combine this concept with the variably adjustable transmission characteristics of a magnetorheological fluid. As a result, the purely quantitative scaling of a maximally predeterminable limit torque to be transmitted between the input part and output part is possible. Since the magnetorheological fluid with the coupling concept according to the invention is not employed as force-emitting medium between two coupling parts rotation-moveably mounted relative to one another, the fluid is not subjected to any degradating shear loads whatsoever. In addition, the parasitic slipping between the input part and output part through the respective contact with the magnetorheological fluid that is known to occur in conventional fluid couplings can be avoided. As a result, unnecessary energy losses through the coupling element are avoided. The coupling principle according to the invention thus combines the advantages of two types of coupling technology, namely that of the purely mechanical coupling with those of a fluid coupling and at the same time avoids their disadvantages.

According to the invention, a torque-limited coupling element with an input part and output part each rotatably mounted about a common rotational axis and at least one connecting means, which from a first position, in which the connecting means interconnects the input part and output part subject to the formation of a positive engagement with one another, can be transferred into a second position upon exceeding of a predeterminable limit torque acting between the input part and output part in which the input part and output part are rotatably mounted relative to one another. The at least one connecting element in the first position is indirectly or directly in non-positive operational connection with a displacement body moveably mounted within a chamber filled with magnetorheological fluid whose position within the chamber is supported by a displacement force brought about by the magnetorheological fluid. To influence the viscosity of the magnetorheological fluid, a unit generating a magnetic field is provided on or in the region of the chamber through which the displacement force of the magnetorheological fluid can be influenced. If the limit torque between the input part and output part is exceeded, the displacement body can be deflected within the chamber against the displacement force brought about by the magnetorheological fluid. As a result, the non-positive connection between the connecting means and the input part and output part is released and the torque transmission is abruptly interrupted.

In principle, the torque-limited coupling element according to the invention makes use of a purely mechanical force transmission mechanism for the torque transmission between the input part and output part that is comparable with that, which corresponds to the torque wrench described in DE 31 40 288 A1 discussed above, wherein a non-positive and positive connection between the input part and output part is established by means of coupling balls that are variable in their radial position. The spring element which quantitatively predetermines the limit torque in the case of DE 31 40 288 A1 is replaced in the case of the coupling element according to the invention with a chamber filled with magnetorheological fluid, in which a displacement body is moveable, preferentially mounted to be movable linearly, which via a rod-like extension protruding through a fluid-tight chamber opening enters into operational connection with the connecting elements, which ensures a non-positive and positive connection between the input part and output part. In order to be able to adjust the magnitude of the torque acting between the input part and output part at which the coupling is to open, and the connecting elements are to release their force-loaded non-positive connection, an adjustable limit force directed at the connecting elements has to be generated which originates from an adjustable movability of the displacement body through the magnetorheological fluid within the chamber. The displacement body through its body shape is matched to the geometrical shape of the chamber which divides the chamber volume into two chamber parts. As a result, both chamber parts are fluidically interconnected to one another via a connecting channel. In a preferred embodiment, the chamber encloses a cylindrical volume within which the likewise cylindrically shaped displacement body divides the chamber into a front and a rear chamber part, both of which are interconnected by an annular gap, which is limited by the displacement body and the chamber inner wall.

If in a preferred manner, a magnetic field is applied in the region of the connecting channel or annular gap. The viscosity of the magnetorheological fluid is greatly influenced in this region. As a result of the influence of the magnetic field, it is somewhat difficult to force the fluid from one chamber part through the annular gap into the other chamber part. Thus, the displacement body can be somewhat easily displaced in axial direction along the chamber so that by adjusting the magnetic field strength, a scalable holding or supporting force for maintaining the non-positive connection of the connecting elements with the input part and output part of the coupling can be generated. If due to operation the limit torque is exceeded, the displacement body is displaced from its position against the displacement forces acting thereon within the chamber, as a result of which the non-positive connection is released. If this case occurs, it is advantageous to switch off the prevailing magnetic field in order to largely eliminate material-wearing frictional forces within the coupling to which in particular the connecting elements are subjected.

With a switched-off magnetic field, the magnetorheological fluid assumes its lowest viscosity so that the displacement body can be returned into its axial starting position within the chamber without major force expenditure. This can be effected using a resetting spring interacting with the displacement body. The coupling is then in a state in which only a very low torque can be transmitted, which is mainly generated by the resetting force of the spring.

The coupling concept according to the invention is based on the method for the torque-limited coupling between an input part rotatably mounted about a common rotational axis and an output part. Both parts enter into a releasably fixed non-positive connection with at least one connecting means for purposes of torque transmission so that the at least one connecting means in a first position, interconnects the input part and the output part in a rotationally fixed manner, subject to the formation of a non-positive connection. The at least one connecting means is transferred into a second position upon exceeding of a predeterminable limit torque acting between the input part and output part, in which the input part and output part rotate relative to one another. The method according to the invention is characterized in that a limit torque is influenced by magnetorheological fluid which enters into interaction with a magnetic field.

In a particularly advantageous manner, the torque-limited coupling element according to the invention is suitable for application to a torque wrench providing a maximum tightening torque for a screw which can be accurately predetermined. Unintentional excessive tightening of the screw can be prevented in this manner. In addition, the torque-limited coupling element can be supplemented with a suitable sensor device in order to sense the actually applied torque between input part and output part. DMS measuring strips, which are to be provided in a suitable position of the coupling housing, are for example appropriate for this purpose.

The coupling elements according to the invention can also be integrated into the drive line of machine tools in a particularly advantageous manner for example to decouple a motor drive from the tool provided on the output side when a certain limit torque is reached. With the help of a magnetic field which is generated to be variable in time and dependent on the application, through which the viscosity of the magnetorheological fluid can be individually adjusted without delay, individual switching characteristics can also be realized which, for example, can be utilized for careful coupling and decoupling between input parts and output parts.

In a similar manner, the coupling element can also be employed in a drive train of motor vehicles, in order to realize coupling operations. Particularly in the case of hybrid vehicles for the rapid coupling or decoupling of the combustion engine and electric motor in each case to/from the driveshaft, the coupling principle according to the invention can be advantageously employed. Auxiliary units in motor vehicles, for example generator etc. can be rapidly coupled or decoupled via the coupling principle according to the invention.

The coupling principle according to the invention is explained in more detail in the following making reference to two concrete exemplary embodiments.

BRIEF DESCRIPTION OF THE DRAWINGS

In the following, the invention is described in terms of exemplary embodiments making reference to the drawings without restriction of the invention.

DETAILED DESCRIPTION OF THE INVENTION

Figure 1:
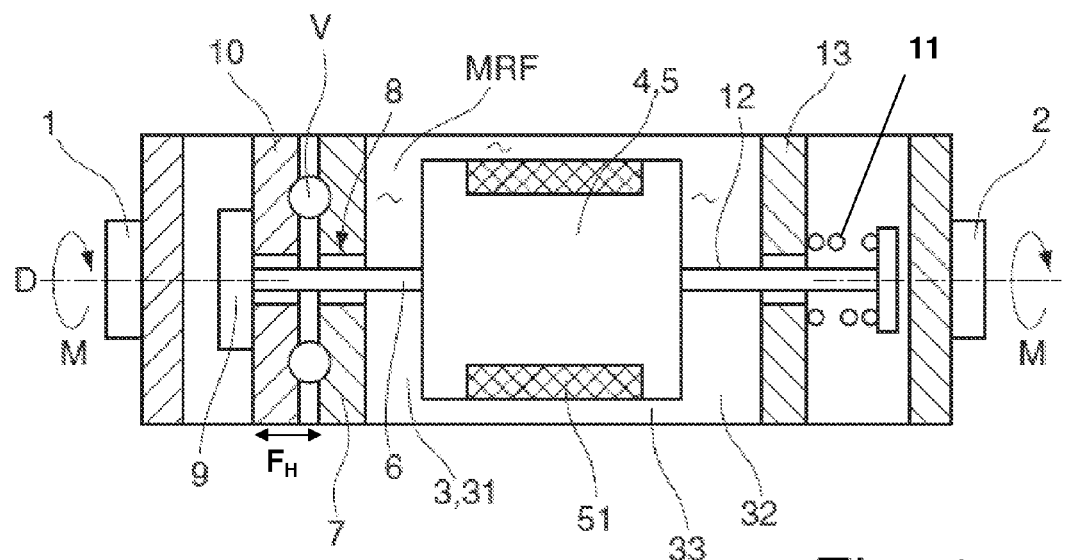
FIG. 1 is a schematic cross-sectional representation through a first preferred exemplary embodiment.

The coupling element shown in cross section in FIG. 1, comprises an input part 1 and an output part 2 which are arranged to be rotatably mounted about a common rotational axis D. For transmitting a torque M on the input 1 to the output 2, both parts 1 and 2 are in a mutual force-loaded non-positive connection, which is realized through a mechanical locking mechanism. A ball-shaped connecting means V, which is provided both on the drive end and output end, protrudes into corresponding recesses matched to the ball contour and in each case form a positive connection. As an alternative to balls, a cylindrical rolling body with cylinder axes orientated radially relates to the rotational axis D are also suitable. Preferentially, two, three or more connecting means V, which are arranged evenly distributed about the rotational axis D, are provided for the non-positive torque transmission from the input part 1 to the output part 2.

For a secure cohesion between the input part 1 and the output part 2, an axially directed holding force F, axially holding both parts together is generated, through which ultimately also the maximum limit torque $M_{max}$ that can be transmitted between the input parts and output parts is determined. If, due to the operation, the maximum torque $M_{max}$ between input part and output part is exceeded, transverse forces orientated in the rotational direction act on the spherically shaped connecting means V through which the spherical connecting means V are ultimately deflected in rotational direction from their counter-contoured recesses on the part of the input part and output part, as a result of which they simultaneously generate axially orientated displacement forces between the input part and output part which ultimately cancels out the positive connection for transmitting the torque between both parts.

To realize the axial holding force $F_H$, which in the state of a non-positive and positive engagement of the connecting means V with the input and output, acts between the input part and output part. A chamber 3 (in contrast with a mechanical tensioning element, for example in the form of a spring generating tensile force) is provided, in which axially to the rotational axis D a longitudinally displacement body 4 divides the chamber 3 into two chamber parts 31 and 32, wherein both chamber regions 31 and 32 are interconnected via a connecting channel 33. In the exemplary embodiment shown in FIG. 1, it is assumed that the input part 1 and output part 2 are designed to be symmetrically rotatable to the rotational axis D. Thus, also the displacement body 4, which encloses an annular gap provides the connecting channel with the inner wall of the chamber 3. The chamber 3 is completely filled with a magnetorheological fluid MRF, so that the magnetorheological fluid MRF circulates around the displacement body 4 on all sides.

In the exemplary embodiment shown in FIG. 1, the displacement body 4 additionally comprises an electromagnet unit 5 having magnetic coil windings 51 arranged directly facing the ring gap 33. Obviously it is conceivable to integrate the magnet unit also in the chamber housing of the drive unit 1 (which is not shown in more detail or design) in the form of a permanent magnet unit, which for the variation of the magnetic field has to be suitably deflected.

The displacement body 4 in the chamber 3 includes a rod-like extension 6, which extends through the axial face-end chamber wall 7 via a fluid-tight opening 8. The face-end of the extension 6 terminates at a force transmission unit 9 of plate-shaped design, which bears against the inner wall of a housing wall 10 provided on the drive side in a torsionally decoupled manner, that is substantially loose, so that the drive-end housing 10 with corresponding axial force action is pulled or pushed in the direction of the output unit through the plate-shaped force transmission unit 9. To generate the holding force $F_H$ acting in axial direction relative to the rotational axis D, the displacement body 4 is preferably held positionally stable within the chamber 3 through the magnetorheological fluid, which has a variable viscosity which is predeterminable in response to the prevailing magnetic field. The fluid can flow through the ring gap only very slowly or with difficulty. The holding force $F_H$, compensated by the displacement body 4, causes an evacuation of the magnetorheological fluid MRF from the right chamber part 31 into the left chamber part 32. If the viscosity is so high that no fluid flow into the right chamber part 32 takes place, the coupling is closed. It is evident that the magnetorheological fluid within the chamber 3 exclusively serves to generate the axially acting holding force $F_H$ and is not exposed to any rotation-induced shear forces whatsoever.

In the event that a torque exceeding the holding force $F_H$ occurs between input and output, the displacement body 4 is moved against the displacement forces acting on it from its position axially in the direction of the input part 1. In this case the coupling is no longer able to transmit any torque between input part and output part.

In an advantageous manner, in this state, the strength of the magnetic field in the annular space 33 is reduced or completely switched off in order to reduce or avoid any remaining axially acting holding forces, which would lead to an increased wear on the spherical connecting means 5 and also on the recesses matched to the ball contour.

For the purpose of returning the released or opened coupling to the state explained at the outset, the effective magnetic field has to be switched off within the annular gap 33, as a result of which the viscosity is reduced and the displacement body is returned into its axial starting position preferentially arranged in the middle relative to the chamber subject to the expenditure of minor axial adjusting forces. For generating the resetting forces, a return spring 11 with minor spring forces is sufficient, which in the exemplary embodiment shown in FIG. 1 is arranged outside the chamber 3 and via a further extension 12, attached at the back of the displacement body 4, which protrudes. A rear chamber wall 13, is operationally connected in a fluid tight manner. Alternatively to such an embodiment version, it is likewise possible to avoid unnecessary fluid-tight chamber openings, to provide the resetting spring 11 within the chamber for example in the region of the chamber part 31 between the chamber wall 7 and the displacement body 4 coaxially to the extension 6.

FIG. 1 shows a situation of the coupling element in which the connecting means V, which typically has a spherical shape, protrude into corresponding recesses matched to the outer contour of each connecting means which are inside the face-end chamber wall 7 and the drive-end chamber wall 10. As long as both walls 7 and 8 enclose the connection means V, the moment of a torque can be transmitted from the input part 1 to the output part 2. If the torque exceeds beyond a torque limit value, then the drive and chamber wall 10 moves slightly axially against the holding force $F_H$ so that the connecting means V can slit between both walls 7 and 10. In such case no torque can be transmitted between input and output.

The holding force is generated by a fixed position of the displacement body 4 within the chamber 3. Assuming that in the situation as shown in FIG. 1, the displacement body 4 is positioned in the center of the chamber 3, which is completely filled with a magnetorheological fluid, which has in the case of the torque transmission, a very high viscosity so that little or no fluid can flow through the very small annulus 33 from the second chamber 32 to the first chamber 31. Even in a case that the torque M exceeds a torque limit, some magnetorheological fluid is forced to flow through the very small annulus so that the drive and chamber wall 10 can move axially against the holding force $F_H$, so that the connecting means V can leave the fixing position. In such case, the coupling element is open. To close the coupling element again, the viscosity of the magnetorheological fluid has to be reduced so that the displacement body 4 can be moved to its mid position. A resetting spring 11 generates the required resetting force acting onto the displacement body 4.

Figure 2:
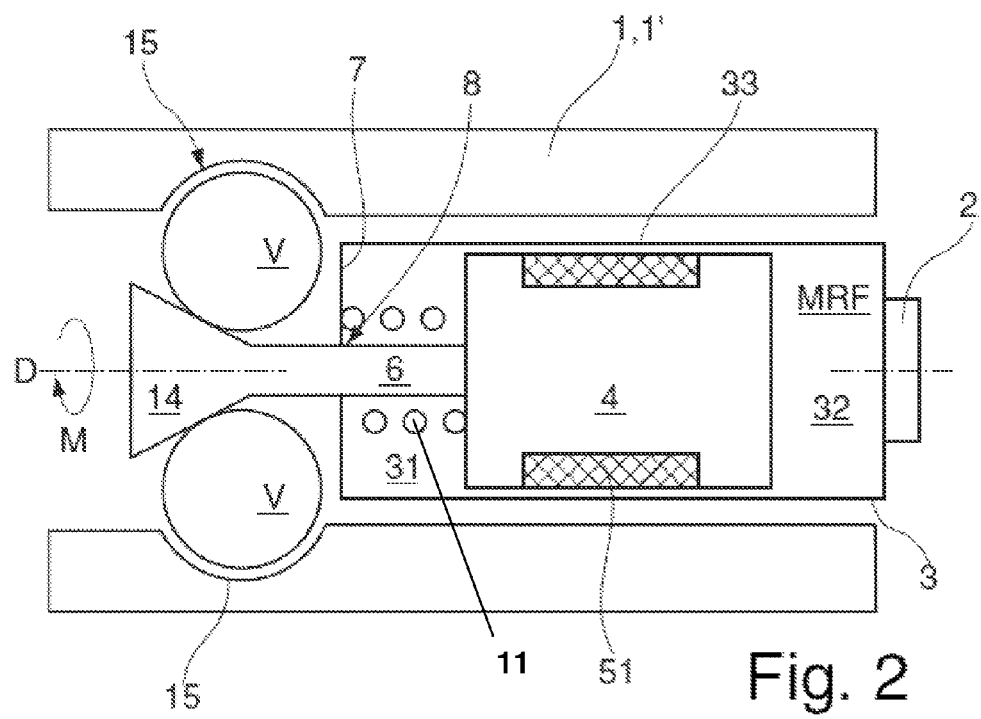
FIG. 2 is a cross-sectional representation through a second preferred exemplary embodiment.

FIG. 2 shows a further exemplary embodiment for a torque-limited coupling element capable of transmitting a torque M on the input part 1 of sleeve-like design to an output part 2 located coaxially radially on the inside. The output part 2 in comparable arrangement to the exemplary embodiment according to FIG. 1 comprises a chamber 3 filled with a magnetorheological fluid MRF, in which a displacement body 4 that is bidirectionally deflectable axially to the rotational axis D is introduced. The displacement body 4 divides the chamber 3 likewise into a left and right chamber part 31 and 32, wherein both chamber parts 31 and 32 are fluidically interconnected through a thin annular channel 33. In the same way as in the exemplary embodiment according to FIG. 1, an electromagnet arrangement with magnet coils 51 facing the annular gap 33 is provided in the displacement body 4. In an advantageous manner, the displacement body 4 has a magnet core, about which the magnet coils 51 are wound. The extension 6 is connected to the displacement body 4 in this case, which protrudes through the face-end chamber wall 7 through a fluid-tight opening 8. The continuation ends in a conical contact surface 14 having conical slotted link surfaces against which spherically shaped connecting means V bear. The connection means V in a starting position are radially pushed to the outside by the conical contact surface 14. The spherical connecting means V terminate in spherical recesses 15 alongside the input part 1 of a sleeve-like design and enter into a force-loaded positive connection with the input part 1. As a function of the torque M prevailing between the input part and output part and of the geometry of the spherical recesses 15 within the sleeve-like drive 1, a force in a rotational direction about the rotational axis D is generated, which results in a displacement of the spherical connecting elements V in radial direction. If the displacement is greater than the ball diameter or the emersion depth with which the individual balls terminate in the spherical recesses 15 of the sleeve-like drive 1, the input part 1 starts to slip relative to the output part 2. In this case, no torque can be transmitted so that the function of a torque-limited safety coupling is satisfied.

For returning the displacement body 4 within the chamber 3 into the original starting position, the effective magnetic field is switched off, as a result of which the magnetorheological fluid becomes less viscous, so that ultimately the displacement body 4 through the force of the resetting spring 11 that becomes effective, which is arranged in this case between the face-end inside of the chamber wall 7 and the displacement body 4, can be returned.

The embodiment shown in FIG. 2 operates very similarly to the above-explained embodiment in FIG. 1. In FIG. 2, the holding Force $F_H$ acts perpendicular to the axial direction of the coupling element due to the conical contact surface 14 which contacts the spherical connecting means V.

The torque-limited coupling element on which the invention is based can be employed in addition to the mentioned operating purpose for realizing a torque wrench and other technical devices such as, for example, a safety coupling in machine tools, hand-held machines, such as for example drilling machines, in the form of a coupling in drive lines of vehicles, agricultural equipment as well as in construction machinery of any type.

LIST OF REFERENCE CHARACTERS

1 Input
1' Sleeve element
2 Output
3 Chamber
31 First chamber
32 Second chamber
33 Annulus
4 Displacement body
5 Electromagnet arrangement
51 Magnet coils
6 Rod-like extension
7 Face-end chamber wall
8 Fluid-tight opening
9 plate-shaped force transmission unit
10 Drive-end chamber wall
11 Resetting spring
12 Rear rod-like extension
13 Rear chamber wall
14 Conical contact surface
15 Spherical recess
V Connecting means
D Rotational axis

The invention claimed is:

1. A torque-limited coupling comprising:
an input and output rotatably mounted about a common rotational axis;
at least one connection which interconnects the input and output in a first position to be rotationally linked to transmit torque and upon exceeding a predeterminable torque limit the at least one connection moves from the first position to a second position at which the input and output are rotatable relative to one another;
the at least one connection in the first position is either indirectly or directly connected with a displacement body which is moveably mounted within a chamber filled with a magnetorheological fluid, the position of the displacement body within the chamber being determined by holding force generated by the magnetorheological fluid;
a magnetic field generator for providing a variable magnetic field coupled to the magnetorheological fluid and which is provided from the displacement body or a housing of the chamber for adjusting the holding force; and
wherein
upon exceeding of the torque limit, the displacement body moves within the chamber against the holding force provided by the magnetorheological fluid.

2. The torque-limited coupling according to claim 1, wherein:
the displacement body separates the chamber into two parts which are interconnected via at least one connecting channel; and
the magnetic field generator is disposed adjacent the at least one connecting channel.

3. The torque-limited coupling according to claim 2, wherein:
the displacement body is guided bidirectionally within the chamber along a linear axis, the two parts are disposed along the linear axis and face the displacement body, and an inner wall of the chamber encloses the at least one connecting channel connecting the two parts to provide an intermediate gap.

4. The torque-limited coupling according to claim 3, wherein:
the displacement body comprises at least one of an electromagnet and a permanent magnet of the magnetic field generator.

5. The torque-limited coupling according to claim 4, wherein:
the displacement body is in operational connection with a resetting spring which forces the displacement body into a position in which the at least one connection is located in the first position.

6. The torque-limited coupling according to claim 3, wherein:
the displacement body is in operational connection with a resetting spring which forces the displacement body into a position in which the at least one connection is located in the first position.

7. The torque-limited coupling according to claim 3, wherein:
the displacement body includes at least one extension protruding in a fluid-tight manner through a wall of the chamber and is indirectly or directly in contact with the at least one connection.

8. The torque-limited coupling according to claim 7, further comprising:
a plate in operational connection with the at least one extension, the at least one extension extending outside the chamber; and wherein
the plate is separated from the chamber wall and encloses a separating gap within the chamber with the plate and the chamber wall each comprising at least one recess in a region of the separating gap, the at least one recess being matched to at least one rolling body of the at least one connection so that the at least one rolling body in the at least one recess establishes a positive connection between the plate and the chamber wall, and the plate is rotatably mounted along a longitudinal direction of the at least one extension and relative to the chamber wall so that upon rotation of the plate, the at least one rolling body emerges from the recesses resulting in the separating gap being enlarged causing the displacement body within the chamber to be deflected to cause the at least one connection to move to the second position.

9. The torque-limited coupling according to claim 2, wherein:
the displacement body comprises at least one of an electromagnet and a permanent magnet of the magnetic field generator.

10. The torque-limited coupling according to claim 9, wherein:
the displacement body is in operational connection with a resetting spring which forces the displacement body into a position in which the at least one connection is located in the first position.

11. The torque-limited coupling according to claim 2, wherein:
the displacement body is in operational connection with a resetting spring which forces the displacement body into a position in which the at least one connection is located in the first position.

12. The torque-limited coupling according to claim 2, wherein:
the displacement body includes at least one extension protruding in a fluid-tight manner through a wall of the chamber and is indirectly or directly in contact with the at least one connection.

13. The torque-limited coupling according to claim 12, further comprising:
a plate in operational connection with the at least one extension, the at least one extension extending outside the chamber; and wherein
the plate is separated from the chamber wall and encloses a separating gap within the chamber with the plate and the chamber wall each comprising at least one recess in a region of the separating gap, the at least one recess being matched to at least one rolling body of the at least one connection so that the at least one rolling body in the at least one recess establishes a positive connection between the plate and the chamber wall, and the plate is rotatably mounted along a longitudinal direction of the at least one extension and relative to the chamber wall so that upon rotation of the plate, the at least one rolling body emerges from the recesses resulting in the separating gap being enlarged causing the displacement body within the chamber to be deflected to cause the at least one connection to move to the second position.

14. The torque-limited coupling according to claim 1, wherein:
the displacement body comprises at least one of an electromagnet and a permanent magnet of the magnetic field generator.

15. The torque-limited coupling according to claim 14, wherein:
the displacement body is in operational connection with a resetting spring which forces the displacement body into a position in which the at least one connection is located in the first position.

16. The torque-limited coupling according to claim 14, wherein:
the displacement body includes at least one extension protruding in a fluid-tight manner through a wall of the chamber and is indirectly or directly in contact with the at least one connection.

17. The torque-limited coupling according to claim 16, further comprising:
a plate in operational connection with the at least one extension, the at least one extension extending outside the chamber; and wherein
the plate is separated from the chamber wall and encloses a separating gap within the chamber with the plate and the chamber wall each comprising at least one recess in a region of the separating gap, the at least one recess being matched to at least one rolling body of the at least one connection so that the at least one rolling body in the at least one recess establishes a positive connection between the plate and the chamber wall, and the plate is rotatably mounted along a longitudinal direction of the at least one extension and relative to the chamber wall so that upon rotation of the plate, the at least one rolling body emerges from the recesses resulting in the separating gap being enlarged causing the displacement body within the chamber to be deflected to cause the at least one connection to move to the second position.

18. The torque-limited coupling according to claim 1, wherein:
the displacement body is in operational connection with a resetting spring which forces the displacement body into a position in which the at least one connection is located in the first position.

19. The torque-limited coupling according to claim 18, wherein:
the displacement body includes at least one extension protruding in a fluid-tight manner through a wall of the chamber and is indirectly or directly in contact with the at least one connection.

20. The torque-limited coupling according to claim 19, further comprising:
a plate in operational connection with the at least one extension, the at least one extension extending outside the chamber; and wherein
the plate is separated from the chamber wall and encloses a separating gap within the chamber with the plate and the chamber wall each comprising at least one recess in a region of the separating gap, the at least one recess being matched to at least one rolling body of the at least one connection so that the at least one rolling body in the at least one recess establishes a positive connection between the plate and the chamber wall, and the plate is rotatably mounted along a longitudinal direction of the at least one extension and relative to the chamber wall so that upon rotation of the plate, the at least one rolling body emerges from the recesses resulting in the separating gap being enlarged causing the displacement body within the chamber to be deflected to cause the at least one connection to move to the second position.

21. The torque-limited coupling according to claim 1, wherein:
the displacement body includes at least one extension protruding in a fluid-tight manner through a wall of the chamber and is indirectly or directly in contact with the at least one connection.

22. The torque-limited coupling according to claim 21, further comprising:
a plate in operational connection with the at least one extension, the at least one extension extending outside the chamber; and wherein
the plate is separated from the chamber wall and encloses a separating gap within the chamber with the plate and the chamber wall each comprising at least one recess in a region of the separating gap, the at least one recess being matched to at least one rolling body of the at least one connection so that the at least one rolling body in the at least one recess establishes a positive connection between the plate and the chamber wall, and the plate is rotatably mounted along a longitudinal direction of the at least one extension and relative to the chamber wall so that upon rotation of the plate, the at least one rolling body emerges from the recesses resulting in the separating gap being enlarged causing the displacement body within the chamber to be deflected to cause the at least one connection to move to the second position.

23. The torque-limited coupling according to claim 22, wherein:
the plate is part of the input and the chamber, the displacement body and the at least one connection are part of the output, or vice versa.

24. The torque-limited coupling according to claim 21, wherein:
the at least one extension comprises a conical surface disposed outside the chamber;
at least two spheres terminate in a recess within a sleeve radially surrounding the spheres to provide a positive connection between the conical surface and the sleeve; and
the sleeve is rotatably mounted about the at least one extension so that upon rotation of the sleeve, the at least two spherical connecting elements are displaced out of the recesses radially relative to the at least one connection causing the at least one extension and the displacement body connected thereto to be deflected within the chamber in longitudinal direction relative to the at least one extension.

25. The torque-limited coupling according to claim 24, wherein:
the sleeve is part of the input, and the chamber, the displacement body provided therein and the at least one extension are part of the output, or vice versa.

26. A torque wrench comprising the torque-limited coupling of claim 1.

27. A safety coupling for a machine tool comprising the torque-limited coupling of claim 1.

28. A method of operation of a torque-limited coupling disposed between an input and output rotatably mounted about a rotational axis which includes at least one connection disposed between the input and the output for providing a limited torque transmission between the input and the output, the at least one connection moving from a first position to a second position upon application of a torque to the input exceeding a predetermined torque limit, the method comprising:
exerting a holding force on a moveable displacement body supported in a chamber with a magnetorheological fluid, coupling a magnetic field to the magnetorheological fluid to hold the displacement body in a first position in the chamber of torque transmission, moving the displacement body against the holding force in the chamber from the first position to the second position when the torque at the input exceeds the torque limit which permits the input and the output to rotate relative to each other and varying the torque limit by varying the magnetic field coupled to the magnetorheological fluid.

29. The method according to claim 28, comprising:
adjusting a strength of the magnetic field to permit movement of the displacement body between first and second positions.

30. The method according to claim 29, comprising:
upon exceeding the torque limit, either switching the magnetic field off or reducing the magnetic field.

31. The method according to claim 30, comprising:
sensing with a sensor torque prevailing between the input and output.

32. The method according to claim 31, comprising determining the holding force by varying viscosity of the magnetorheological fluid by varying strength of the magnetic field.

33. The method according to claim 30, comprising determining the holding force by varying viscosity of the magnetorheological fluid by varying strength of the magnetic field.

34. The method according to claim 29, comprising:
sensing with a sensor torque prevailing between the input and output.

35. The method according to claim 34, comprising determining the holding force by viscosity of the magnetorheological fluid by varying strength of the magnetic field.

36. The method according to claim 29, comprising determining the holding force by varying viscosity of the magnetorheological fluid by varying strength of the magnetic field.

37. The method according to claim 28, comprising:
sensing with a sensor torque prevailing between the input and output.

38. The method according to claim 37, comprising determining the holding force by varying viscosity of the magnetorheological fluid by varying strength of the magnetic field.

39. The method according to claim 28, comprising determining the holding force by varying viscosity of the magnetorheological fluid by varying strength of the magnetic field.

40. The method of claim 28 wherein the torque-limited coupling comprises a torque wrench.

\* \* \* \* \*